Aug. 5, 1930.   I. M. STEIN   1,772,091
INTEGRATING METHOD AND APPARATUS
Filed Aug. 6, 1925   2 Sheets-Sheet 1
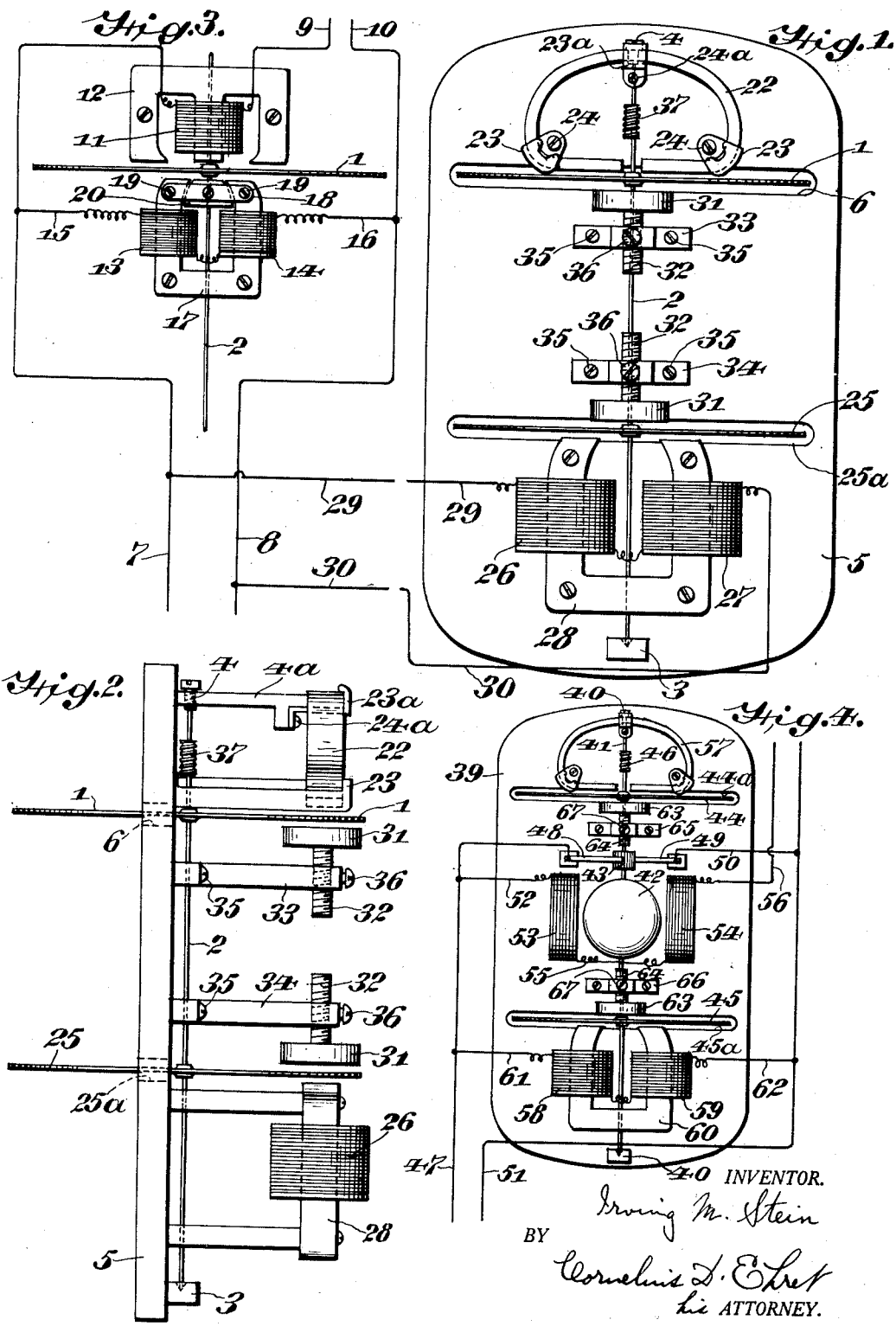
INVENTOR.
Irving M. Stein
BY Cornelius D. Ehret
his ATTORNEY.

Aug. 5, 1930.  I. M. STEIN  1,772,091
INTEGRATING METHOD AND APPARATUS
Filed Aug. 6, 1925   2 Sheets-Sheet 2

Inventor:
Irving M. Stein
By Cornelius D. Ehret
his Attorney.

Patented Aug. 5, 1930

1,772,091

UNITED STATES PATENT OFFICE

IRVING M. STEIN, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

INTEGRATING METHOD AND APPARATUS

Application filed August 6, 1925. Serial No. 48,691.

My invention relates to a method of, and to apparatus utilizable in, integrating an electrical quantity with respect to time, as an electric current or electro-motive-force.

In accordance with my invention, the driving torque of suitable mechanism, as a watthour meter, is modified to obtain an integration, not of the product of current and electro-motive-force, but of either current or electro-motive-force.

Further in accordance with my invention, the change of driving effect of either the series or shunt coil of a watthour meter is neutralized by the application of a retarding torque proportional either to current or electro-motive-force, as desired.

Further in accordance wtih my invention, the rotatable structure of a watthour meter driven by a torque proportional to the product of current and electro-motive-force in opposition to a torque independent of current or electro-motive-force, is opposed by a third torque whose magnitude is dependent upon the magnitude of the electro-motive-force.

My invention resides in the method and apparatus of the character hereinafter described and claimed.

For an illustration of some of the various forms my invention may take, reference is to be had to the accompanying drawing, in which:

Fig. 1 is a front view of a modified watthour meter of the alternating current type.

Fig. 2 is a side elevation of the apparatus shown in Fig. 1.

Fig. 3 is a rear view of the apparatus shown in Fig. 1 showing the series and shunt coils.

Fig. 4 is a front view of a modified watthour meter of the direct current type.

Figure 5:
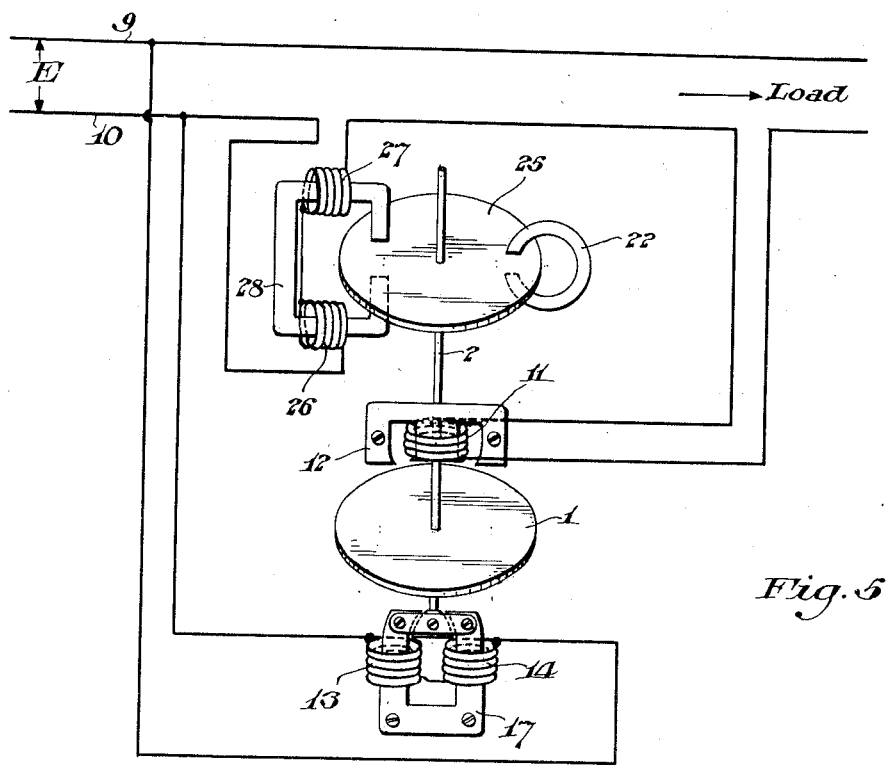
Fig. 5 is a diagrammatic illustration of apparatus shown in Figs. 1 and 3 utilized for integration of electro-motive-force.

Referring to Figs. 1, 2 and 3, a rotatable disk or driven element 1 of aluminum, or other suitable material, is supported on a shaft 2 mounted in a fixed bearing 3 and a bearing 4 adjustable on a member $4^a$. The bearings are disposed adjacent opposite ends of a frame 5 provided with the usual elongated opening 6 receiving the disk 1.

Conductors 7 and 8 leading from a source of current (not shown) are extended by conductors 9 and 10 to the load (not shown) and a coil 11 mounted on a suitable laminated core 12 is connected in series with the load. Coils 13 and 14 connected across the line by conductors 15 and 16 are mounted on a suitable core 17 to which a strap 18 is secured in any desired manner, as by screws 19, the strap carrying a core-closer 20 providing air gaps between adjacent pole faces. As is well understood in the art, a driving torque proportional to the product of load current by electro-motive-force by power factor is produced by interaction between the flux due to the eddy currents induced in the disk 1 by the series or load coil 11 and the flux produced by load coil 11 and shunt coils 13 and 14.

Disposed adjacent the disk 1 is the usual permanent magnet 22 held in position by clamps 23 and $23^a$, the former secured to the frame 5 in any suitable manner, as by screws 24, and the latter to the member $4^a$ by screws $24^a$. The flux produced by magnet 22 induces eddy currents in the disk 1 proportional to its speed of rotation which react with the permanent magnet flux to produce a retarding action on the disk.

In accordance with my invention, the ultimate driving torque is rendered independent of the electro-motive-force in the present instance, and hence dependent solely on the current, by applying to the rotatable structure of the system an additional retarding torque that is proportional to the square of the electro-motive-force. As will be afterwards explained, this additional retarding torque is but one component of the total retarding torque. If desired, this torque may be applied directly to the disk 1, but preferably to another disk 25 of aluminum, or other suitable material, mounted on the shaft 2 and received in an opening $25^a$ of the frame 5. Coils 26 and 27 adjacent disk 25 are mounted on a core 28 connected across the line by conductors 29 and 30. Interaction between the flux due to the eddy currents induced in the rotating disk 25 and the flux of coils 26 and 27 creates a retarding torque that is directly proportional to the speed of rotation and to the square of the electro-motive-force.

The retarding effects of permanent magnet 22 and the electro-magnet comprising coils 26 and 27 may be separately adjusted by pole pieces 31 of iron, or other suitable material, provided respectively with depending shanks 32 in screw-threaded engagement with supports 33 and 34 attached to the frame 5 by screws 35. Lock screws 36 threaded respectively into supports 33 and 34 serve to hold shanks 32 in adjusted position.

For ordinary small variations in line voltage, as of the magnitude of from 1 to 10 per cent, the percentage change in the retarding torque produced by the coils 26 and 27 is approximately twice the percentage voltage change. The combined retarding torque, then, comprises the part developed by the permanent magnet 22 which is independent of the electro-motive-force and the part developed by coils 26 and 27, which changes by twice the voltage change. By proper adjustment of pole pieces 31, the two parts of the total retarding torque may be made approximately equal at normal voltage, with the result that the combined retarding torque varies substantially as the voltage over a range sufficient to include normal line changes.

In this manner, if the source of power produces an alternating current, the registration of the modified meter as indicated on the counting train (not shown) driven by worm gear 37 actually represents the product of the current by the power factor by the time. A true integration of current with respect to time alone is obtained where the power factor of the load circuit is substantially constant.

Referring to Fig. 5, there is shown a system utilizing apparatus similar to that shown in Figs. 1 and 3 for effecting integration of electro-motive-force instead of load current. This is accomplished by rendering the ultimate driving torque independent of the load current, and in practice is done by applying a retarding torque to the rotatable structure of the system that is directly proportional to the square of the current. This retarding torque, however, is but a component of the entire retarding torque, and is produced electromagnetically, as by coils 26 and 27 connected in series with the load, instead of across the voltage source as heretofore described. Coils 26 and 27 are constructed so as to have low resistance in order to prevent overheating at normal load current. As previously explained, adjustments may be effected so that the retarding torques due respectively to permanent magnet 22 and due to retarding coils 26 and 27 are approximately equal, with the result that the combined retarding torque varies substantially as the load current over a limited range.

As in the case of integration of current wherein a variation in electro-motive-force of from 1 to 10% is permissible. The load current during integration of electro-motive-force may also vary from 1 to 10% without producing appreciable error in the integrated result.

While the foregoing description relates to a watthour meter of the alternating current type, my invention is also applicable to a direct current watthour meter, one example of which is shown in Fig. 4 as comprising a frame 39 carrying bearings 40 supporting a shaft 41 carrying a spherical armature 42, a commutator 43, disks 44 and 45, of suitable material, as aluminum, and a worm 46 driving a counting train (not shown). Disks 44 and 45 are received, respectively, in elongated openings 44$^a$ and 45$^a$ in the frame 39.

A conductor 47 leading from the source of current supply (not shown) is connected to a brush 48 contacting with commutator 43, another brush 49 extending the circuit from the commutator 43 to a conductor 50 connected to a conductor 51 which leads back to the other side of the source of current supply. Conductor 47 is connected by a conductor 52 to a field coil 53 mounted in a suitable opening in the frame 39. Coil 53 is connected in series with another similar field coil 54, likewise mounted in a suitable opening in the frame 39 by a conductor 55, and a conductor 56 connects both of said field coils in series with the load (not shown).

The flux of a permanent magnet 57 induces eddy currents in disk 44 proportional to its speed of rotation, which react with the permanent magnet flux to produce a retarding action on the rotatable structure of the system. In a manner substantially as described with respect to Figs. 1, 2 and 3, the ultimate driving torque is rendered independent of electro-motive-force by applying to the rotatable structure of the system an additional retarding torque that is proportional to the square of the electro-motive-force. This torque may be applied directly to the disk 44, but preferably to disk 45 by coils 58 and 59 mounted on a core 60 and connected across the line by conductors 61 and 62.

The retarding effects of permanent magnet 57 and the electro-magnet comprising coils 58 and 59 may be separately adjusted by pole pieces 63 of iron, or other suitable material, provided, respectively, with depending shanks 64 in screw threaded engagement with suitable supports 65 and 66, lock screws 67 threaded respectively in supports 65 and 66 serving to hold shanks 64 in adjusted position.

Figure 6:
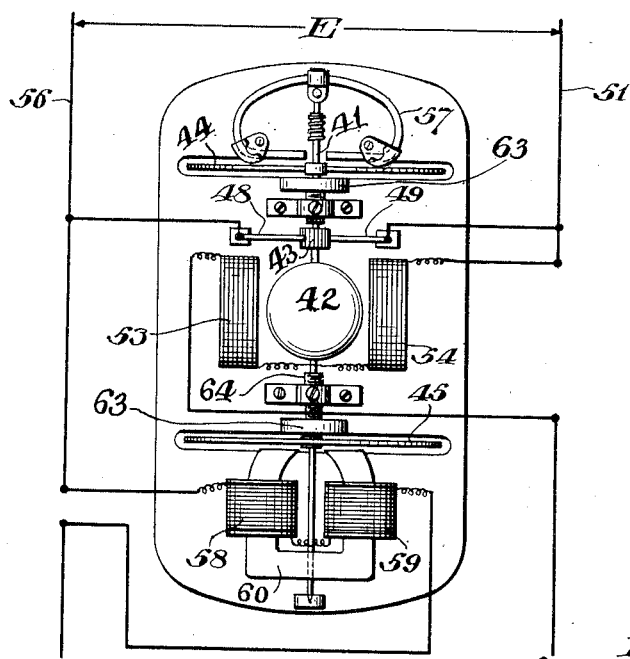
Fig. 6 is a front view of the modified watthour meter shown in Fig. 4 having different circuit connections.

Referring to Fig. 6 of the drawings, there is shown apparatus similar to that shown in Fig. 4 for obtaining an integration of electromotive force.

As described aforesaid with respect to Figs. 1, 2 and 3, the integration of electro-motive-force of a direct current system rather than load current may be obtained by applying to the rotatable structure of the system a retarding torque that is directly proportional to the square of current in a branch connected directly in series with the load. As in the previous instance, this retarding torque will not comprise the total retarding torque, but will be a component of the same. To this end, coils 58 and 59 are connected in series with the load, instead of across the line as in Fig. 4, and together with permanent magnet 57 constitute the retarding means for the rotatable structure. The magnetic retarding effects produced by the electromagnet energized by coils 58 and 59, and the permanent magnet 57 are so adjusted by pole pieces 63 that, as in the alternating current system, the two are approximately equal at normal load current. Accordingly for comparatively small variations in load current, the ultimate driving torque is rendered independent of changes in said current, and an integration of electromotive-force is thereby effected.

The term "electrical energy component" as used in the appended claims is used in a comprehensive sense to include either current or electro-motive force.

What I claim is:

1. The method of integrating magnitudes of current within a substantial variation in magnitude of electro-motive-force of the circuit metered, which comprises producing a torque dependent upon the interaction of magnetic fields whose magnitudes correspond respectively with the magnitudes of the current and electro-motive-force, opposing said torque by a second torque developed independently of either the current or electro-motive-force, and causing to operate cumulatively with said second torque a torque whose magnitude depends upon the magnitude of the electro-motive-force and for normal magnitude of the electromotive force is substantially equal to the magnitude of said second torque.

2. The method of integrating magnitudes of current within a substantial variation in magnitude of electro-motive-force of the circuit metered, which comprises rotating an element by a torque dependent upon the interaction of magnetic fields whose magnitudes correspond respectively with the magnitudes of the current and electro-motive-force, retarding the rotation of the element by a second torque developed independently of either the current or electro-motive-force, and causing to operate cumulatively with said second torque a torque whose magnitude is dependent upon the magnitude of electro-motive-force and for normal magnitude of the electromotive force is substantially equal to the magnitude of said second torque.

3. Integrating apparatus comprising a driven element, means for driving said element by a torque proportional to the product of current and electro-motive-force, means independent of either current or electro-motive-force for applying a retarding torque to said driven member, and means for opposing said first torque by a third torque whose magnitude depends upon the magnitude of the electromotive-force and for normal magnitude thereof is substantially equal to said second torque.

4. Integrating apparatus comprising a disk, means for rotating said disk by a torque proportional to the product of current and electro-motive-force, means independent of either current or electro-motive-force for applying a retarding torque to said disk proportional to the speed thereof, and means for opposing said first torque by a third torque whose magnitude depends upon the magnitude of electro-motive-force and for normal magnitude thereof is substantially equal to said second torque.

5. Integrating apparatus comprising a disk, means for rotating said disk by a torque proportional to the product of current and electro-motive-force, means independent of either the current or electro-motive-force for applying a retarding torque to said disk, means for opposing said first torque by a third torque whose magnitude depends upon the magnitude of electro-motive-force, and means for adjusting the value of said third torque.

6. Integrating apparatus comprising a shaft, means for rotating said shaft by a torque proportional to the product of current and electro-motive-force, means independent of either the current or electro-motive-force for applying a retarding torque to said shaft, and means for establishing a third torque dependent upon electro-motive-force and operating cumulatively with said second torque and normally equal in magnitude thereto to retard rotation of said shaft.

7. Integrating apparatus comprising a shaft, means for rotating said shaft by a torque proportional to the product of current and electro-motive-force, means independent of either the current or electro-motive force for applying a retarding torque to said shaft proportional to the speed thereof, a disk carried by said shaft, and means for applying to said disk a third torque dependent upon electro-motive-force and operating cumulatively with said second torque and normally equal in magnitude thereto to retard rotation of said shaft.

8. Integrating apparatus comprising a shaft, means for rotating said shaft by a torque proportional to the product of current and electro-motive-force, means independent of either the current or electro-motive-force for applying a retarding torque to said shaft, a disk carried by said shaft, means for applying to said disk a third torque dependent upon electro-motive-force and operating cumulatively with said second torque to retard rotation of said shaft, and means for adjusting the value of said third torque.

9. Integrating apparatus comprising a shaft, a disk carried thereby, means comprising coils connected respectively in series with and across the load co-acting with said disk to develop a torque causing rotation thereof, means for retarding rotation of said disk by another torque, a second disk carried by said shaft, and a coil connected across the load co-acting with said second disk to develop a third torque operating cumulatively with said second torque to retard rotation of said shaft and disks.

10. Integrating apparatus comprising a shaft, a disk carried thereby, means comprising coils connected respectively in series with and across the load co-acting with said disk to develop a torque causing rotation thereof, means for retarding rotation of said disk by another torque, a second disk carried by said shaft, a coil connected across the load co-acting with said second disk to develop a third torque operating cumulatively with said second torque to retard rotation of said shaft and disks, and means for adjusting the value of said third torque.

11. Integrating apparatus comprising a shaft, a disk carried thereby, means comprising coils connected respectively in series with and across the load co-acting with said disk to develop a torque causing rotation thereof, means for retarding rotation of said disk by another torque, a second disk carried by said shaft, a coil connected across the load co-acting with said second disk to develop a third torque operating cumulatively with said second torque to retard rotation of said shaft and disks, and a pole piece adjustable with respect to said last mentioned coil.

12. The combination with a watthour meter having a disk, means for rotating said disk by producing a torque dependent upon the interaction of magnetic fields whose magnitudes correspond respectively with the magnitudes of current and electro-motive force, and means for normally opposing said torque by a second torque, of means for developing a third torque whose magnitude depends upon the magnitude of electro-motive-force and operating cumulatively with said second torque to retard rotation of said disk.

13. The combination with a watthour meter having a shaft, a disk carried thereby, means for rotating said disk by producing a torque dependent upon the interaction of magnetic fields whose magnitudes correspond respectively with the magnitudes of the current and electro-motive-force, and means for normally opposing said torque by a second torque, of a second disk carried by said shaft, and a coil connected across the load co-acting with said second disk to develop a third torque operating cumulatively with said second torque to retard rotation of said shaft and disks.

14. The combination with a watthour meter having a shaft, a disk carried thereby, means for rotating said disk by producing a torque dependent upon the interaction of magnetic fields whose magnitudes correspond respectively with the magnitudes of current and electro-motive-force, and means for normally opposing said torque by a second torque, of a second disk carried by said shaft, a coil connected across the load co-acting with said second disk to develop a third torque operating cumulatively with said second torque to retard rotation of said shaft and disks, and a pole piece adjustable with respect to said last mentioned coil.

15. Integrating apparatus comprising a driven element, means for driving said element by a torque dependent on the interaction of two magnetic fields representative of current and electro-motive-force respectively, means independent of said magnetic fields for applying a retarding torque to said driven member, and means for opposing said first torque by a third torque whose magnitude is representative of one of said magnetic fields and is normally substantially equal to said retarding torque.

16. In an electrical system for integrating an electrical quantity within a substantial range of variation in magnitude of another correlated electrical quantity, the method which comprises producing a torque dependent upon the interaction of magnetic fields whose magnitudes correspond respectively with the magnitudes of the electrical quantities of current and electro-motive-force, normally opposing said torque by a second torque independent of said electrical quantities, and opposing said first named torque by a third torque whose magnitude depends upon the magnitude of one of said electrical quantities and is normally substantially equal to said opposing torque.

17. The method of integrating magnitudes of an electrical energy component, which comprises producing a torque dependent upon the interaction of magnetic fields the magnitude of one of which corresponds with the magnitude of said electrical energy component, normally opposing said torque by a second torque independent of either component of said electrical enregy, and opposing said first named torque by a third torque whose magnitude varies with the magnitude of the other of said magnetic fields and for normal value thereof is substantially equal to the magnitude of said second torque.

18. The method of integrating magnitudes of an electrical energy component, which comprises producing a torque dependent upon the interaction of magnetic fields the magnitude of one of which corresponds with the magnitude of said electrical energy component, normally opposing said torque by a second torque independent of either component of said electrical energy, and causing to operate cumulatively with said normal opposing torque a torque whose magnitude varies with the magnitude of the other of said magnetic fields and for normal value thereof is substantially equal to the magnitude of said second torque.

19. The combination with a watt hour meter having a movable element, means producing a torque dependent upon the interaction of magnetic fields whose magnitudes correspond to the magnitudes of electrical energy components effecting movement of said element, and means producing a retarding torque independently of said electrical energy components, of means developing an opposing torque retarding movement of said element and whose magnitude varies with the magnitude of an electrical energy component and for normal magnitude thereof is substantially equal to said retarding torque.

IRVING M. STEIN.